United States Patent Office 3,052,674
Patented Sept. 4, 1962

3,052,674
PROCESS FOR THE PRODUCTION OF 2-(BENZENE-SULFONAMIDO)-OXAZOLES
Viktor Wolf, Hamburg-Hochkamp, and Werner Loop, Hamburg-Lockstedt, Germany, assignors to Nordmark-Werke Gesellschaft mit beschränkter Haftung, Hamburg, Germany
No Drawing. Filed Jan. 13, 1961, Ser. No. 82,393
Claims priority, application Germany Feb. 1, 1960
3 Claims. (Cl. 260—239.9)

Our invention relates to a process for the production of 2-(benzenesulphonyl)-amino-oxazoles, preferably 2-(p-aminobenzenesulphonyl)-amino-oxazoles and 2-(p-acylamino-benzenesulphonyl)-amino-oxazoles. These products are valuable therapeutic agents or intermediate products for the production of such agents. For instance the 2 - (p - aminobenzenesulphonyl) - amino - 4.5 - dimethyl-oxazole is a well known bacteriostatic agent and the 2-(p-acylaminobenzenesulphonyl)-amino-4.5-dimethyl-oxazoles are valuable intermediate products for preparing the said 2-(p-amino-benzenesulphonyl)-amino-4.5-dimethyl-oxazole.

It is the aim of our invention to render it possible to produce the compounds mentioned before in a technically and economically better way than it was possible before. It is a further aim of our invention to prepare certain new 2-(benzenesulphonyl)-amino-oxazoles.

We have found that 2-(benzenesulphonyl)-amino-oxazoles can be obtained in a technically simple manner and with surprisingly good yields by reacting a cyanamide derivative in which one hydrogen atom of the $NH_2$-group is replaced by a benzenesulphonyl radical in an acid medium with an α-hydroxyketone. The new process is operative within a broad range of starting materials and of reaction conditions. One may use for instance as starting materials the α-hydroxyketones of the general Formula I $$HO-CH-R$$
$$O=C-R \quad (I)$$

wherein one R represents a member of the group consisting of the alkyl radicals, the hydroxyalkyl radicals, the benzyl radical and the phenyl radical and the other R stands for a member of the group consisting of hydrogen, the alkyl radicals, the hydroxyalkyl radicals, the benzyl radical and the phenyl radical. In this way the products of the general Formula II are obtained

wherein the two R's have the same meaning as in Formula I and X represents a member of the group consisting of hydrogen and the monovalent substituents such as the acylamino groups and the amino group.

According to a preferred embodiment of our invention we use as starting materials the α-hydroxyketones of the general Formula III $$HO-CH-R_1$$
$$O=C-R_1 \quad (III)$$

wherein each of the two $R_1$'s represents a member of the group consisting of hydrogen, the alkyl radicals containing 1–3 carbon atoms, the benzyl radical and the phenyl radical.

In this way the products of the general Formula IV are obtained

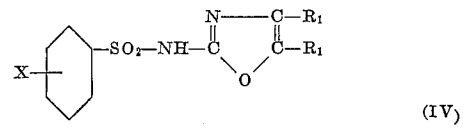

wherein the two $R_1$'s have the same meaning as in Formula III and X has the same meaning as in Formula II.

As benzenesulphonyl radicals there are preferably used such benzenesulphonyl radicals which carry in the p-position to the sulpho group the amino group or a radical which can be converted into the amino group such as the acylamino groups.

The addition of acid to the reaction mixture can be varied within wide limits. For example it is possible to use that quantity of acid which corresponds stoichiometrically to the introduced metal salt of the cyanamide derivative, so that the free cyanamide derivative for example the p-acetylaminobenzenesulphonyl cyanamide is present with its specific acid pH value. However it is also possible to work with a considerable excess of acid so that for example a 6 N-acid corresponding to a substantially 20% hydrochloric acid is present at the end of the reaction. The conversion is expediently effected in a diluent; water as well as organic solvents miscible with water can be employed successfully as diluent. The reaction is carried out at medium temperatures, for instance between 0 and 100° C., but it is advisable to effect the reaction at 35–80° C. The molar ratio is preferably about 1:1; however the desired final products are also obtained when using one starting product in excess. Working up is effected by conventional methods.

In one form of our invention which is particularly advantageous from a technical point of view the α-hydroxyketones are prepared in situ i.e. a product which is a suitable starting material for preparing the α-hydroxyketone in question is reacted to form the α-hydroxyketone, the reaction medium being chosen in such a way that the reaction mixture which is obtained by this step can be used for preparing the 2-(benzenesulphonyl)-amino-oxazoles without first isolating the α-hydroxyketone in question. In this embodiment of our invention water, organic solvents which are miscible with water and mixtures of water and such solvents are used as reaction medium for the step of preparing the α-hydroxyketones in situ since the following step of preparing the oxazole-compound can be easily carried out in such a reaction medium.

One may use for instance as starting material for preparing the α-hydroxyketones in situ the 1.2-diketones of the general Formula V $$O=C-R_1$$
$$O=C-R_1 \quad (V)$$

wherein the two $R_1$'s have the same meaning as in Formula III,
and convert one keto group into the hydroxyl group while using one of the solvents mentioned before. The solvent used for this reaction must not contain groups which are liable of being attacked by hydrogen. Preferably water, alcohols which are miscible with water or mixtures of water and such alcohols are used as reaction medium. The said conversion of one keto group into the hydroxyl group can be carried out by known methods for instance by reacting the 1.2-diketone with hydrogen, preferably with nascent or catalytically stimulated hydrogen such as hydrogen developed from zinc granules and hydrochloric acid, until one keto group of the diketone is converted into the hydroxyl group. Suitable reaction temperatures for the said conversion are 35–80° C. When using diacetyl as starting material and working according to the above given directions solutions of acetoin are obtained which contain good yields of acetoin and can be used directly for the process of preparing the oxazole-compound.

Other suitable starting materials for preparing the α-hydroxyketones in situ are the ethinylcarbinoles of the general Formula VI

(VI)

wherein $R_1$ represents a member of the group consisting of hydrogen, the alkyl radicals with 1–3 carbon atoms and the phenyl radical.

The α-hydroxyketones are obtainable by adding water according to known methods to the said carbinoles while using an aqueous reaction medium consisting of water or a mixture of water and an organic solvent which is miscible with water and maintaining an acid pH-value during this process. The addition of water can be carried out for instance by treating the carbinol in question in an aqueous medium with sulphuric acid and mercury sulphate. A suitable starting material is methyl-ethinyl-carbinol which is converted with a very good yield into acetoin when treated in an aqueous medium according to the above described method.

Other suitable starting materials are the α-chloro- and α-bromo-ketones of the general Formula VII

(VII)

wherein the two $R_1$'s have the same meaning as in Formula III and X stands for a member of the group consisting of chlorine and bromine.

In these compounds the chlorine or bromine atom can be replaced by a hydroxyl group while using as reaction medium water or a mixture of water and an organic solvent which is miscible with water. The reaction is preferably carried out at the boiling point of the reaction medium. The said replacement can be carried out for instance by heating the α-chloro- or α-bromo-ketone in an aqueous alkaline medium to the boiling point of the said medium. Suitable starting materials are for instance 3-chloro-2-butanone and 3-bromo-2-butanone. The 3-chloro-2-butanone is preferred because its physiological properties are less unpleasant.

The conversion of the said α-hydroxyketones into the 2-benzenesulphonyl-amino-oxazoles can be effected simultaneously with the formation of the α-hydroxyketones or subsequent to their formation taking regard to the fact that the reaction of the α-hydroxyketones with the cyanamide derivatives in which one hydrogen atom of the $NH_2$-group is replaced by a benzenesulphonyl radical must be effected in an acid medium.

The following examples serve to illustrate our invention.

*Example 1*

67 g. of p-amino-benzenesulphonyl-cyanamide and 30 g. of acetoin are heated while stirring to 60° C. with 350 cc. of 10% hydrochloric acid. A clear solution is obtained after about 20 minutes and after another 20 minutes, deposition of crystals starts at 60° C. The mixture is cooled by stirring. The colourless crystalline hydrochloride of the 2 - (p - amino-benzenesulphonyl)-amino-4,5-dimethyl-oxazole is suction-filtered and first washed with 10% hydrochloric acid and then with 20% common salt solution.

The hydrochloride obtained is suspended in 600 cc. of water and, while stirring, 10% sodium hydroxide solution is added dropwise until the pH value is 4 to 5.

The 2-(p-amino-benzenesulphonyl)-amino-4,5-dimethyl-oxazole is precipitated as colourless crystals with the melting point 197–199° C. The diethanolamine salt crystallising satisfactorily from water melts at 144–145° C. Yield=67% of the theoretical.

*Example 2*

A mixture of 129 g. of the calcium salt of p-acetamino-benzene-sulphonyl-cyanamide, 44 g. of acetoin, 500 cc. of water and 50 g. of 36% hydrochloric acid is heated for 4 hours to 60° C. while stirring. Colourless crystals of 2-(p-acetamino-benzene-sulphonyl)-amino-4,5-dimethyl-oxazole are soon precipitated from the initially clear solution. After 4 hours, the crystalline precipitate is suction-filtered while hot and thoroughly washed with hot water. 2-(p-acetamino-benzenesulphonyl)-amino-4,5-dimethyl-oxazole is obtained as colourless crystals having the melting point 240–242° C. with decomposition. Yield 80%.

From 2-(p-acetaminobenzene-sulphonyl)-amino-4,5-dimethyl-oxazole, the substance of Example 1 is obtained in known manner by hydrolytic splitting of the acetyl group.

*Example 3*

A solution of 129 g. of the calcium salt of p-acetyl-amino-benzenesulphonyl-cyanamide in 500 cc. of water is introduced into a solution of 75 g. of phenyl acetyl carbinol in 100 cc. of methanol. The mixture is heated to 60° C. and 43 cc. of 36% hydrochloric acid are added while stirring. An exothermic reaction takes place. The temperature is kept between 60 and 70° C. by occasional cooling. The reaction product first of all precipitates as an oil, which gradually solidifies in crystalline form. The reaction mixture is heated for 4 hours at 60° C. The precipitated crystal mass is then suction-filtered while hot and thoroughly washed with hot water. Yield=88.9% of the theoretical.

For purification purposes, it is recrystallised from a mixture of dimethyl formamide and water 5:1. The 2-(p-acetaminobenzenesulphonyl) - amino - 4 - methyl - 5 - phenyl-oxazole is thus obtained as colourless crystals, which melt at a temperature between 260 and 264° C. with evolution of gas.

For splitting off the acetyl group, the above substance is boiled under reflux for 30 minutes with 6 times the quantity of 10% sodium hydroxide solution. The 2-(p-aminobenzenesulphonyl) - amino - 4 - methyl - 5 - phenyl-oxazole crystallises out from the solution on neutralisation as slightly yellowish crystals.

Purification can be effected by recrystallising the ethanolamine salt of the said sulphonamide derivative from water. The ethanolamine salt forms colourless crystals with a melting point of 210–213° C. The 2-(p-aminobenzenesulphonyl) - amino - 4-methyl-5-phenyl-oxazole is obtained therefrom in conventional manner as colourless crystals with a melting point of 266–269° C.

*Example 4*

50.0 g. of benzoin are stirred into 300 cc. of ethanol. 63.0 g. of the calcium salt of p-acetyl-amino-benzene-sulphonyl-cyanamide, dissolved in 340 cc. of hot water, are added to the mixture. The mixture is heated while stirring to 60° C. and 150 g. of 36% hydrochloric acid are added. After the heat of reaction subsides, the mixture is heated for 1 hour under reflux while stirring, filtered off from the undissolved substance and the filtrate is placed, for crystallisation purposes, in a refrigerator. The precipitated crystal mass is suction-filtered and washed with a mixture of ethanol/water 1:1.

The product obtained is suspended in 4 litres of water and sodium hydroxide solution is added while stirring until the pH value is 10–11. The undissolved and unreacted benzoin is filtered off with suction and the filtrate is brought to a pH value of 5 with dilute acetic acid while stirring. The 2-(p-acetaminobenzenesulphonyl)-amino- 4,5-diphenyl-oxazole thereby precipitates as a very fine mass which is difficult to filter. After adding a small quantity of glacial acetic acid, the precipitate is agglomerated and can then be filtered quite well.

For splitting off the acetyl group, the substance which is obtained is boiled under reflux for 30 minutes with 10 times the quantity of 4% sodium hydroxide solution.

It is diluted with 10 times the volume of water, brought to a pH value of 10, treated with active carbon and the filtrate is brought while warm to pH 5. The 2-(p-amino-benzenesulphonyl) - amino - 4,5-diphenyl-oxazole precipitates as a syrup, which solidifies as crystals on cooling. For purification purposes, it is recrystallised from a large quantity of benzene. The 2-(p-amino-benzenesulphonyl)-amino-4,5-diphenyl-oxazole melts between 202 and 204° C.

Example 5

15.5 kg. (0.03 mol) of the industrial calcium salt of p-acetyl-amino-benzenesulphonyl-cyanamide are dissolved in boiling water, purified with 0.2 kg. of decolourising carbon and then 4.4 kg. (0.05 mol) of acetoin are added at 50° C. 6.1 kg. (0.06 mol) of concentrated hydrochloric acid are then slowly incorporated by stirring at 50° C. After a few hours, the substance is filtered, washed and dried. Yield=13.84 kg.=89.6% of 2-(p-acetyl - amino - benzenesulphonyl) - amino - 4,5 - dimethyl-oxazole. By hydrolysis in 10% sodium hydroxide solution (boiling for 30 minutes), carbon purification at 90° C. and pH 9.1 in approximately 6% solution and precipitation at pH 5.5, 9.02 kg.=67.6% of 2-(p-aminobenzenesulphonyl)-amino - 4,5 - dimethyl-oxazole are obtained.

Example 6

200 cc. of 10% hydrochloric acid at a temperature of 60° C. are poured over 50 g. of zinc granules placed in a three-necked flask provided with a stirrer device, reflux condenser, dropping funnel and thermometer. 21.5 g. (¼ mol) of diacetyl are introduced into the dropping funnel and each ¼ of the diacetyl is added within 5 minutes at 60° C. and while stirring well to the hydrochloric acid. After completing the addition, stirring is continued for another 5 minutes and the solution obtained is decanted off from the zinc. A solution of 51.6 g. (0.1 mol) of the calcium salt of p-acetyl-amino-benzenesulphonyl-cyanamide in 200 cc. of water and 20 cc. of concentrated hydrochloric acid is added to the decanted solution while stirring at 60° C. A reaction occurs which proceeds exothermally, during which the temperature is kept at about 60° C. by cooling. The 2-(p-acetaminobenzenesulphonyl) - amino-4,5-dimethyl-oxazole immediately crystallises out from the solution. The crystals are suction-filtered while warm after having been stirred for one hour at 60° C. and are washed with warm water. The substance can be recrystallised from dimethyl formamide and water (1:2). It then melts in the region of 240° C. with decomposition. Yield=38.2 g.

The 2-(p-aminobenzene-sulphonyl)-amino-4,5-dimethyl-oxazole with a melting point of 197–199° C. is obtained therefrom by alkali hydrolysis.

Example 7

A mixture of 10 g. of mercury sulphate, 500 cc. of water and 50 cc. of 96% sulphuric acid are placed in a 1-litre three-necked flask provided with a stirrer mechanism, reflux condenser, dropping funnel and thermometer. 17.5 g. of methyl-ethinyl-carbinol (0.25 mol) are added dropwise to the mixture at 55–60° C. while stirring well and within 1 hour, and thereafter 5 g. of fresh mercury sulphate are introduced into the mixture, and once again, within one hour, another 17.5 g. of methyl-ethinyl-carbinol. After fresh addition of 5 g. of mercury sulphate, the mixture is stirred for 2 hours at 55–60° C. and thereafter filtered (solution I).

In the meantime, a solution of 129.5 g. (¼ mol) of the calcium salt of p-acetyl-amino-benzenesulphonyl)-cyanamide in 500 cc. of water is prepared, 25 g. of 96% sulphuric acid are added to the solution while stirring and cooling, this acid having previously been diluted to a 60% acid, and the substance is filtered off from the precipitated calcium sulphate (filtrate: solution II).

The solution II heated to 60° C. is added to the solution I heated to 60° C. An exothermic reaction takes place, in which the 2-(p-acetylaminobenzene-sulphonyl)-amino-4,5-dimethyl-oxazole is precipitated as a syrup which immediately crystallises. After stirring for 1 hour at 60° C., the crystal mass is filtered off with suction and washed with water. The 2-(p-acetylaminobenzene-sulphonyl)-amino-4,5-dimethyl-oxazole melts in the region of 240° C. with decomposition after having been recrystallised from dimethyl formamide-water (1:2). Yield =80.0 g.

Example 8

A mixture of 54.5 g. (0.5 mol) of 3-chloro-2-butanone with 50 cc. of water and 50 g. of sodium bicarbonate is heated in a two-necked flask provided with a stirrer and reflux condenser, for 6 hours to 100° C. while stirring well. After completion of the evolution of gas, the mixture is neutralised by 10 g. of 36% hydrochloric acid. A solution of 129.5 g. of the calcium salt of p-acetyl-amino-benzenesulphonyl-cyanamide in 500 cc. of water and 160 cc. of concentrated hydrochloric acid is added to the resulting solution at 60° C., the mixture becoming strongly heated. The temperature is brought to 60° C. by cooling and the mixture is stirred for 1 hour at this temperature. The 2 - (p - acetaminobenzene-sulphonyl)-amino-4,5-dimethyl-oxazone is precipitated as a syrup which immediately crystallises, yield=72.2 g. The substance can be recrystallised from dimethyl formamide and water 1:2, and it melts in the region of 240° C. with decomposition. Instead of using the sodium bicarbonate, it is also possible to employ an equivalent quantity of sodium carbonate, calcium carbonate or 10% sodium hydroxide solution.

Example 9

24.5 g. (0.1 mol) of 1-chloro-1,3-diphenyl-propanone (M.P. from methanol 69–71° C., prepared by chlorination of dibenzyl ketone), 10 g. (0.1 mol+20%) of sodium bicarbonate, 50 cc. of dioxane and 25 cc. of water are heated under reflux in an oil bath at 100–110° C. for three hours while stirring. Violent evolution of carbon dioxide occurs, this being terminated after three hours. On cooling, a semi-solid reaction product is precipitated. The supernatant solution is decanted, the reaction product is washed with water and dissolved in 500 cc. of hot ethanol. The ethanolic solution, while at a temperature of 60° C., is stirred with a solution of 25.8 g. (0.05 mol) of the calcium salt of p-acetyl-amino-benzene-sulphonyl-cyanamide in 100 cc. of water and thereafter with 25 cc. of 36% hydrochloric acid. The mixture is stirred for 3 hours at 60° C., cooled, a small quantity of precipitated impurity is filtered off and the filtrate is treated with active carbon. After distilling off the ethanol, the reaction product, contaminated by syrup, is separated out. After standing for one day in a refrigerator, the sediment is separated from the aqueous solution, washed with water and thereafter extracted with methanol, in which the greasy impurity is readily soluble, while the 2 - (p - acetylaminobenzene - sulphonyl) - amino - 4-benzyl-5-phenyl-oxazole is sparingly soluble. After filtering with suction and washing with methanol, the substance can be recrystallised from glacial acetic acid. The 2 - (p - acetaminobenzene - sulphonyl) - amino - 4-benzyl-5-phenyl-oxazole forms colourless crystals which melt between 237–239° C. with evolution of gas.

For splitting off the acetyl group, the substance is boiled for 45 minutes with 40 times the quantity of 5% sodium hydroxide solution. On cooling, the sodium salt of 2,-(p - amino - benzene - sulphonyl) - amino - 4 - benzyl- 5-phenyl-oxazole crystallises out as colourless crystals. These are suction-filtered, washed with 20% cold common salt solution, dissolved in hot water, the solution is treated with active carbon and, by neutralising the hot filtrate with acid, the 2-(p-amino-benzene-sulphonyl)-amino-4-benzyl-5-phenyl-oxazole is obtained therefrom as colourless crystals with the melting point 232–233° C.

*Example 10*

A solution of 165 g. of 3-hexine-2,5-diol in 840 cc. of water is mixed while stirring with a solution of 10 g. of mercury-II-sulphate and 25 g. of concentrated sulphuric acid in 70 cc. of water. The temperature is kept at 28–30° C. with occasional cooling and, after the exothermic reaction has subsided, the mixture is left to stand for 24 hours at 25–26° C. After neutralising with sodium hydroxide solution, the water is distilled off as far as possible in vacuo. The distillation residue is stirred with ethanol, filtered off from the precipitated salt and the ethanol is removed from the filtrate by vacuum distillation. The fresh oily distillation residue is distilled at a pressure of 1–2 mm. After first runnings, a slightly brownish oil is obtained with a bath temperature between 130 and 150° C. and a boiling range of 89–98° C. and 1.5–1 mm., 66% of this oil consisting of hexane-2,5-diol-3-one.

18.5 g. of the distillate, containing 11.1 g. of hexane-2,5-diol-3-one are dissolved in a solution of 22.2 g. of the calcium salt of p-acetyl-amino-benzenesulphonyl-cyanamide in 100 cc. of water and at a temperature of 60° C. and 20 cc. of concentrated hydrochloric acid are added while stirring. During the exothermic reaction, an oil is precipitated. The temperature is kept for 1 hour at 50–60° C., whereupon the solution is cooled, decanted off from the precipitate, which is washed in water and thereafter dissolved in 200 cc. of 15% sodium hydroxide solution. After decolouring with active carbon, it is heated for 24 hours at 40° C., allowed to cool and then 500 cc. of saturated common salt solution are added. It is decoloured with active carbon and the filtrate is neutralised. The precipitate thereby obtained is treated with dilute hydrochloric acid. The undissolved substance is filtered off and the acid filtrate is neutralised. The fresh precipitation is extracted by boiling with methanol. Some of the 2-(p-aminobenzene-sulphonyl)-amino-4-(2'-hydroxy-propyl)-5-methyl-oxazole remains undissolved as a colourless crystal mass, and the remainder crystallises from the methanolic solution on standing in a refrigerator. After being recrystallised from dimethyl formamide-water 1:1, the substance melts at 241° C.

*Example 11*

The reaction mixture obtained by reacting 110 g. of 96% propargyl alcohol in 190 cc. of water by addition of 10 g. of mercury-II-sulphate and 2 g. of concentrated sulphuric acid is distilled off as far as possible in the vacuum of a water jet pump. The distillate contains about 60 g. of acetol.

205 g. of the calcium salt of p-acetyl-amino-benzenesulphonyl-cyanamide are dissolved in 750 cc. of hot water. The mixture is cooled to 60° C. and 200 cc. of concentrated hydrochloric acid are added. The above distillate, containing 60 g. of acetol, is added to this solution while stirring, the temperature being kept between 50 and 70° C. by cooling. After the exothermic reaction has subsided, stirring is continued for another hour at 60° C., the 2-(p-acetaminobenzene-sulphonyl) - amino-4-methyl - oxazole which has crystallized out is suction-filtered while hot and washed with hot water.

Yield=184 g., corresponding to 31.2%, calculated on propargyl alcohol.

For purification purposes, this is suspended in 4.5 litres of water and dissolved by adding 10% sodium carbonate solution. It is decolourised with active carbon and, by neutralising the filtrate, the substance is obtained as colourless crystals with the melting point 214–216° C.

For splitting off the acetyl group, the substance is dissolved in 900 cc. of 15% sodium hydroxide solution, the solution is kept for 24 hours at 40° C., then diluted with 900 cc. of water, whereupon the solution is adjusted to pH 9 by means of acid. After decolourising with active carbon, the filtrate is neutralised and the 2-(p-amino-benzene-sulphonyl)-amino-4-methyl-oxazole separates out as colourless crystals. For purification purposes it can be recrystallized from boiling 50% ethanol or from boiling water. The 2-(p-amino-benzene-sulphonyl) - amino-4-methyl-oxazole dried at 103° C. until the weight is constant then forms colourless crystals having the melting point 191–194° C.

*Example 12*

By reacting a solution of 66.2 g. of the calcium salt of p-acetaminobenzenesulphonyl-cyanamide in 240 cc. water with 26.2 g. pentanol-(2)-one-(3) while adding 80 cc. conc. hydrochloric acid and proceeding according to Example 2, 2-(p-acetylaminobenzenesulphonyl) - amino-4-ethyl-5-methyl-oxazole is obtained forming colourless crystals having the melting point 243–245° C. with evolution of gas. The yield amounts to 68.6 g.=82.7%.

By alkaline hydrolysis 2-(p-aminobenzenesulphonyl)-amino-4-ethyl-5-methyl-oxazole is obtained forming colourless crystals melting at 187–189° C.

What we claim is:

1. A process for preparing 2-benzenesulfonamido oxazoles of the formula

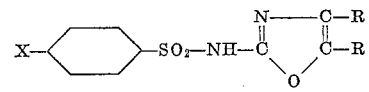

Wherein one R is a member selected from the group consisting of alkyl with 1 to 3 carbon atoms, benzyl and phenyl, the other R is a member selected from the group consisting of hydrogen, alkyl with 1 to 3 carbon atoms, benzyl and phenyl and X is a member selected from the group consisting of the amino and acyl amino groups, which comprises heating a benzenesulfonylcyanamide of the formula

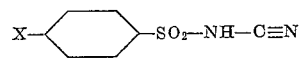

wherein X is the same as above,
with an α-hydroxyketone of the formula

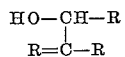

wherein R is the same as above,
at a temperature below 100° C. while maintaining an acid pH-value in the reaction mixture and isolating the 2-benzenesulfonamido oxazole thus obtained.

2. A process as claimed in claim 1 wherein the reaction is carried out in the presence of a reaction medium selected from the group consisting of water, the lower alkanols, acetone and mixtures thereof.

3. A process as claimed in claim 1 wherein the α-hydroxyketone is acetoin.

References Cited in the file of this patent

UNITED STATES PATENTS

| | | |
|---|---|---|
| 2,413,973 | Howk et al. | Jan. 7, 1947 |
| 2,494,524 | Sprague | Jan. 10, 1950 |
| 2,809,966 | Loop et al. | Oct. 15, 1957 |

OTHER REFERENCES

Backer et al.: "Rec. Trav. Chem.," vol. 61, pages 463–6, (1942).